United States Patent [19]
Berger et al.

[11] 3,801,967
[45] Apr. 2, 1974

[54] MONOLITHIC BIPOLAR TRANSISTOR STORAGE ARRANGEMENT WITH LATENT BIT PATTERN

[75] Inventors: Horst Heinz Berger, Sindelfingen; Knut Najmann, Gartringen; Hansgeorg Pietrass, Dettenhausen; Siegfried Wiedmann, Stuttgart, all of Germany

[73] Assignee: International Business Machines Corporation, Armonk, N.Y.

[22] Filed: Feb. 12, 1973

[21] Appl. No.: 331,430

[30] Foreign Application Priority Data

June 30, 1972 Germany...................... 2232189

[52] U.S. Cl. .. 340/173 FF, 340/173 R, 340/173 LI, 307/238

[51] Int. Cl. . G11c 11/40, G11c 13/00, H03k 3/281

[58] Field of Search ..... 340/173 R, 173 FF, 173 LI; 307/238

[56] References Cited

UNITED STATES PATENTS 3,662,351 5/1972 Ho ................................ 340/173 LI

*Primary Examiner*—Terrel W. Fears
*Attorney, Agent, or Firm*—Robert J. Haase

[57] ABSTRACT

A monolithic storage arrangement comprising a plurality of cross-coupled bipolar transistor bistable storage cells selectively operable both as a read-write storage and as a read-only storage. The switching nodes of each storage cell are connected to respective switching bipolar transistors which are complementary with respect to the cross-coupled transistors, the collector-base section of the switching transistors being connected in parallel with the base-emitter section of the respective cross-coupled transistors. For read-only operation, the emitter of one of the switching transistors is connected to a control line with the emitter of the other switching transistor remaining unconnected in accordance with predetermined fabrication personalization. The connected switching transistor injects current into the base of its associated cross-coupled transistor when the control line is suitably energized to place the cell into a desired read-only state. Both switching transistors are deactivated during read-write operation.

8 Claims, 8 Drawing Figures

MONOLITHIC BIPOLAR TRANSISTOR STORAGE ARRANGEMENT WITH LATENT BIT PATTERN

BACKGROUND OF THE INVENTION

The presently known monolithic storage arrangements made in integrated semiconductor technique can be roughly divided into so-called read-write storages and read-only storages. The read-write storage shows the conventional storage characteristics, i.e., that data can be written in, stored in the associated storage locations, and read out again later. The principle of the read-only storage consists in that predetermined data are firmly stored therein and that they can only be read out of the individual storage cells upon request.

Systems where the use of both storage types mentioned is necessary or advisable are equipped with both storage types in a known manner. Thus, when starting the operation of a computer information is generally transmitted, from a unit consisting for instance of a read-only storage, into the read-write storage. The read-only storage containing the required start program transmits in that process the instructions via the central computing unit into the read-write storage. Consequently, such a system requires a separate read-only storage, apart from the read-write storage. A storage arrangement which can be applied both as read-write storage and as read-only storage will therefore be of major importance. Particularly with resepct to costs, size, and complexity considerable improvements could be achieved by using such a storage arrangement. The storage arrangement thus containing a latent bit pattern could be advantageously applied also in those cases where in the main storage program tables are stored but are not required continuously, or where the operator requires programs for error checking functions.

It is known that practically all triggers or bistable circuits show asymmetries. The "Handbook of Semiconductor Electronics," Hunter, 2nd edition, for instance, discusses on pages 15–20 to 15–34 various methods with which reliable balance conditions for operation in the stationary state can be ensured. The balance conditions required in the stationary state are of such a nature that in that state the trigger or the bistable circuit do not switch to another state and thus destroy the information stored therein. Correspondingly, the switching state effected by the supply of a respective information remains equally stored until a following information is written in. This reveals the known fact that asymmetries in the circuit structure are disadvantageous or even unacceptable as in extreme cases they render the bistable circuit instable and thus unreliable when it is to be used as a storage cell.

The present invention relates to a method for the advantageous utilization of this known fact for providing a storage arrangement which consists of bistable storage cells and is normally used for read-write operation, with a predetermined latent bit pattern. This bit pattern can be generated and read out if required. Thus, additional use as read-only storage is possible. Such a storage arrangement is disclosed in the publication "Electronics," Aug. 16, 1971, pp. 82–85.

The known suggestions for executing the personalization of the storage arrangement required for generating the necessary latent bit pattern include an intentional asymmetry of the individual storage cells. This can be an AC or a DC asymmetry. A typical AC asymmetry can be achieved by equipping the two circuit halves of the bistable storage cells with different time constants. These time constants, as indicated in the cited publication, are a function of the collector load resistors, of the collector mass capacities, and of the base-emitter voltages of the transistors forming the storage cells. By building the individual bistable storage cells out of circuit halves where these values differ a personalization can therefore be obtained.

As a typical example for a DC asymmetry the cited publication mentions a storage arrangement the storage cells of which are personalized by a suitable one-sided addition of a corresponding resistor element, e.g., a Schottky diode.

A disadvantage of some of the known storage arrangements is that the latent bit pattern can be generated only by switching off and subsequently on the operating voltage. For avoiding this disadvantage, the cited publication provides a storage arrangement where the latent bit pattern is generated in with the aid of a diode which is connected to one side of each storage cell (which per se is of a symmetrical structure). For operation as read-write storage, the diode is kept in the non-conductive state. For use as read-only storage, the diode is switched for a short time into the conductive state. It is thus no longer necessary to pulse the operating voltage of the storage cell.

The above-mentioned known storage arrangements which can be used selectively either as a read-write storage or as a read-only storage have the common outstanding feature that the storage cells have to be of an asymmetrical structure. As the normal accidental asymmetries which are due to manufacturing tolerances have surely to be more than compensated the intentional asymmetry has to be relatively high. A problem arises particularly in connection with storage arrangements having storage cells of DC asymmetry. The result of this asymmetry is that according to the switching state currents of different intensity flow through the individual storage cells. These differing currents have the effect that the connected driver circuits have to be designed accordingly and should be of a corresponding complex nature. The same applies to the connected read circuits.

Storage cells of DC or AC asymmetry have stability problems in common. Storage cells of DC asymmetry, when used in a read-write storage, always have a preferred switching state. This results in a higher failure sensitivity. Storage cells of AC asymmetry, because of the differing time constants of their two circuit halves, have the tendency of switching into the preferred state, which can only be prevented by slow pulsation. Here, therefore, we evidently have a basic contradiction. The operation as a read-only storage requires a high pulse speed so as to ensure the effect of the asymmetry. In the operation as a read-write storage, however, the asymmetry must have no effect so that only slow pulsation is possible. Besides, such storage cells, when they are of monolithic structures, have increased space requirements. The asymmetry problem is addressed in copending patent application, Ser. No. 318,147, filed Dec. 26, 1972, in the names of U. Baitinger et al., for "Monolithic Storage Arrangement With Latent Bit Pattern," and to the present assignee which discloses the technique of connecting to each switching node of a symmetrically structure bistable storage cell a switching element capable of introducing controllable asymmetry. Only one of the switching elements is having storage cells of DC asymmetry. The result of this asymmetry is that according to the switching state currents of different intensity flow through the individual storage cells. These differing currents have the effect that the connected drive circuits have to be designed accordingly and should be of a corresponding complex nature. The same applies to the connected read circuits.

Storage cells of DC or AC asymmetry have stability problems in common. Storage cells of DC asymmetry, when used in a read-write storage, always have a preferred switching state. This results in a higher failure sensitivity. Storage cells of AC asymmetry, because of the differing time constants of their two circuit halves, have the tendency of switching into the preferred state, which can only be prevented by slow pulsation. Here, therefore, we evidently have a basic contradiction. The operation as a read-only storage requires a high pulse speed so as to ensure the effect of the asymmetry. In the operation as a read-write storage, however, the asymmetry must have no effect so that only slow pulsation is possible. Besides, such storage cells, when they are of monolithic structure, have increased space requirements. The asymmetry problem is addressed in copending patent application "Monolithic Storage Arrangement With Latent Bit Pattern," U. Baitinger et al., Filed Dec. 26, 1972, Ser. No. 318,147) which discloses the technique of connecting to each switching node of symmetrically structured bistable storage cell a switching element capable of introducing controllable asymmetry. Only one of the switching elements is connected to a control line for rendering it operational during a read-only mode. The other (unconnected) switching element maintains the symmetry of the storage cell during a read-write mode of operation but is not actuated during the read-only mode due to its lack of connection to the control line. Thus, the storage cell is selectively rendered symmetrical during the read-write mode and asymmetrical during the read-only mode.

SUMMARY OF THE INVENTION

A monolithic storage arrangement is provided comprising a plurality of symmetrically structured bistable storage cells which can be operated selectively both as read-write storage and as read-only storage. The read-only storage function is achieved without disturbing effects with respect to read-write storage operation. The latter relates particularly to the stability and switching speed when operated as read-write storage. Finally, the read-only storage function is achieved in a bipolar embodiment without additional space allocation or additional fabrication processing steps with respect to the storage arrangements operating in read-write manner only.

In accordance with the present invention, the storage array cells comprise cross-coupled, bipolar transistor flipflops and switching transistors which are complementary with respect to the flipflop transistors, the collector-base section of said switching transistors being connected in parallel to the base-emitter section of the respective associated flipflop transistor. To personalize the latent bit pattern in the array, only the switching transistor generating the asymmetry is connected via its emitter to an associated control line and injects, controlled via said control line, a current pulse into the base of the associated flipflop transistor.

It has proved advantageous to use the bit lines of the storage as control lines.

An arrangement advantageous particularly with respect to space requirements and the simplicity of monolithic structure consists in that the flipflop transistors with base zones in common emitter zone and collector zones in said base zones are symmetrically and vertically designed, and that the switching transistors are laterally designed and respectively consist only of another emitter zone corresponding to the base zone of the flipflop transistors, whereas its base zone is identical with the common emitter zone, and its collector zone with the respective base zone of the flipflop transistors.

In order to achieve symmetry in read-write operation with uncomplicated personalization for the read-only storage operation, it is advantageous that the bit lines are arranged over the respective associated emitter zones of the switching transistors and that they are, or are not, connected thereto, in accordance with the desired personalization, via a contact hole or line section, respectively.

Furthermore, a simplified personalization at the finished storage designed for read-write operation can be achieved in that all emitter zones of the switching transistors have contacts in a first metallization plane, and that the personalization at the finished semiconductor chip is effected through conductive lines in a second metallization plane, said conductive lines being connected to the respective contacts via contact holes.

Finally, for avoiding parasitic currents in selected bit lines during a read operation, an embodiment consists in that the emitters of the switching transistors causing the asymmetry are connected to bit lines of the storage cells belonging to the same word and being adjacent in the storage matrix, and that during the read operation these storage cells are operated with a very low current only, or switched off altogether.

DESCRIPTION OF THE PREFERRED EMBODIMENT

The storage cell represented in FIG. 1 will first be described only to the extent of those circuit parts which are required for standard read-write operation. The switching transistors S and S' required additionally according to the invention will be dealt with later.

Figures 1, 2A, 2B, 2C:
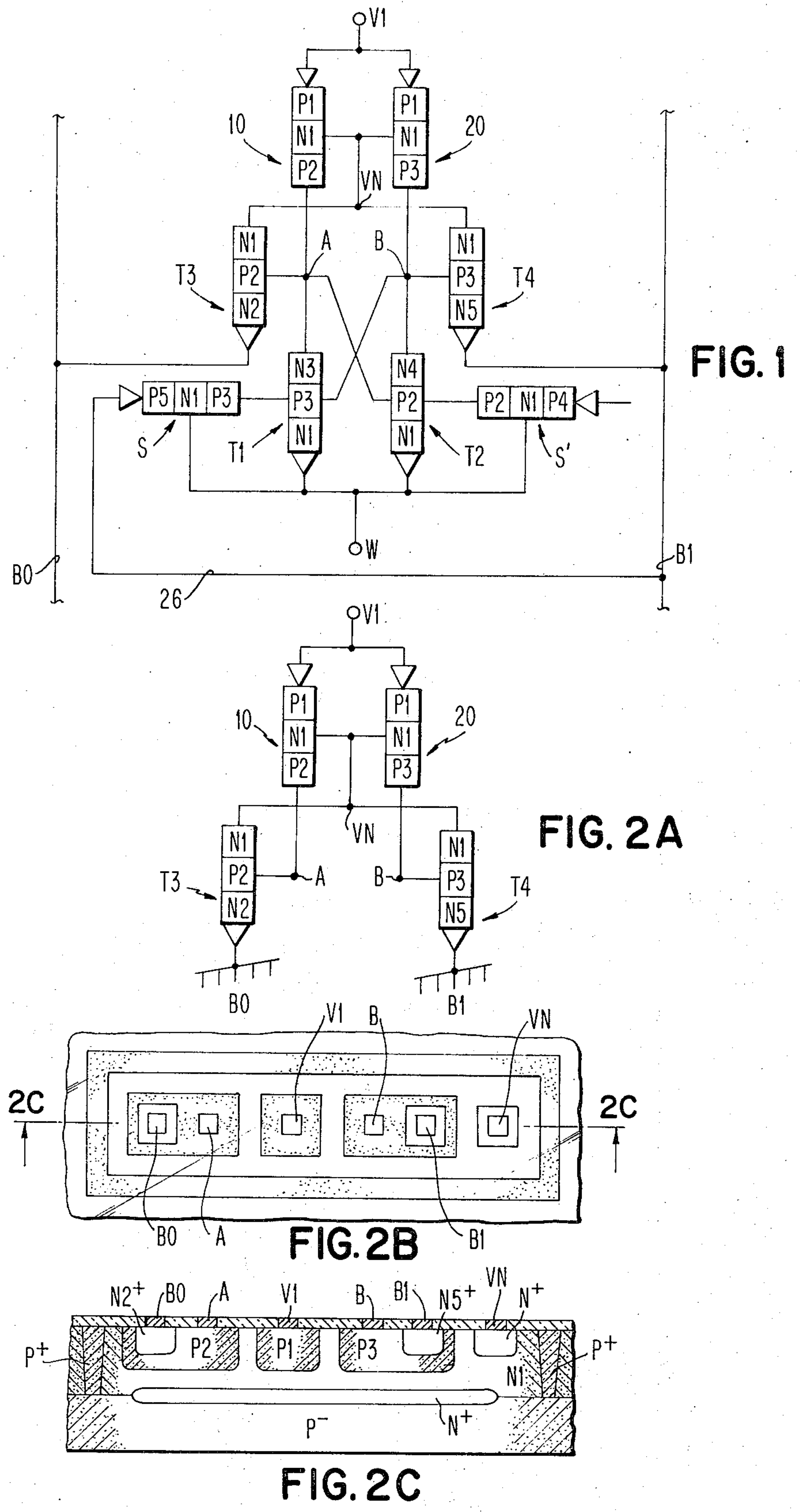
FIG. 1 is a schematic diagram of a preferred embodiment of the present invention.
FIG. 2A is a schematic diagram of a portion of the embodiment of FIG. 1.
FIG. 2B is a plan view of a preferred integrated circuit layout for the structure of FIG. 2A.
FIG. 2C is a cross-sectional view of the structure of FIG. 2B.

The main component of the storage cell of FIG. 1 is a direct cross-coupled transistor flipflop. The two NPN flipflop transistors T1 and T2 are connected on the emitter side to the potential of a work line W. In the collector circuits there are two controllable transistors 10 and 20 which are linked to connector V1. The bases of transistors 10 and 20 are applied to a common connection VN. As specified below, this connection coincides with the N-epitaxy layer of the monolith.

In comparison with a flipflop the additional demand made to a storage cell is that the stored information, i.e., one or both collector potentials of the cross-coupled flip-flop transistors T1 and T2 can be interrogated and, if necessary, altered by switching the flipflop. Besides, a storage cell which is to operate at a storage matrix has to permit clear addressing of a single, or a group of, storage cells and that by operations at addressed storage cells (write, read) the information of non-addressed storage cells remains intact.

For the reading-in and out of information the storage cell is equipped with two write-read transistors T3 and T4. The bases of these, in the present example, NPN transistors are connected to the collector and base potentials, respectively, of the cross-coupled flipflop transistors T1 and T2. The collectors of the two write-read transistors T3 and T4 are applied to the common connection VN of the bases of the two load transistors 10 and 20. The emitters of the two write-read transistors are respectively applied to an associated bit line B0 and B1.

For the non-restrictive information read-out, with the use of such a storage cell in a work-organized matrix, the potential for instance is raised at work line W in such a manner that all other write-read transistors T3 and T4, respectively, of the non-addressed storage cells are sure to be rendered non-conductive. A read current over the bit lines can then be caused by an addressed cell only. It is not absolutely necessary in that connection that the write-read transistors of the non-addressed cells are completely non-conductive; it will be sufficient if the read current caused by the addressed storage cell is higher than the sum of the emitter currents of the write-read transistors T3 and T4, respectively, belonging to the storage cells of the entire word. Via a differential amplifier it can then be concluded, from the differing potentials or current intensities of bit lines B0 and B1, respectively, which of the base potentials of write-read transistors T3 and T4 had been higher, which thus definitely determines the state of the cell.

For the writing-in of information into the cell the conductive flipflop transistor T1 or T2, respectively, is rendered non-conductive, provided this has not been done already. For this purpose, its base potential has to be lowered.

For addressing, the potential on the work line is again raised and the potential on one of the two bit lines B0 or B1 is lowered to such an extent that the transistor connected thereto draws a base current over load transistor 20 or 10, respectively, and thus lowers the potential in Point B or A, respectively. In this manner, flipflop transistor T1 or T2, respectively directly connected to Point B or A, respectively, is rendered non-conductive and the other transistor T2 or T1 is consequently rendered conductive. As a result, the storing of the necessary information is achieved.

In addition to the raising of the potential on word line W the cell current can be raised, for the purpose of accelerating reading and writing, by means of suitable addressing via connection V1.

In FIGS. 2A–2C, reference is made to a particularly space-saving topological design of part of the storage cell shown in FIG. 1, the part being presented in FIG. 2A. The plan view of the circuit part of FIG. 2A in monolithic form is represented in FIG. 2B. A cross-sectional view along section (2C—2C) of FIG. 2B is shown in FIG. 2C. The two read-write transistors T3, T4, together with load transistors 10, 20, are integrated into a common isolation pit (P+). For that purpose, base zones P2 and P3 of vertical read-write transistors T3, T4 form a unit with the collector zones of the lateral load transistors 10, 20. Besides, collector zones N1 of transistor T3 or T4 form a unit with the common base zone of transistors 10 or 20, respectively. Therefore, in the surprisingly small layout in FIGS. 2B and 2C, there are all the transistors of FIG. 2A with the necessary interconnections. There is the possibility of not using parts of the isolation separation zones P+ when the storage cell is used in a storage matrix. It can be sufficient there to perform the contacting of the epitaxial layer N1 via connection VN only once for a series of storage cells. The sub-collector zone N+ shown in FIG. 2C is not required in every case.

Figure 3A:
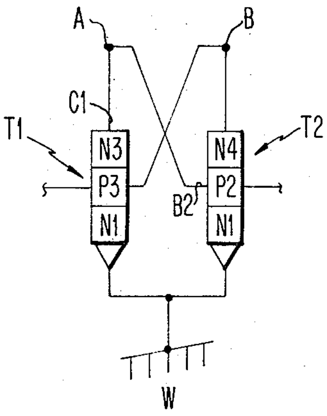
FIG. 3A is a schematic diagram of another portion of the embodiment of FIG. 1.
Figure 3B:
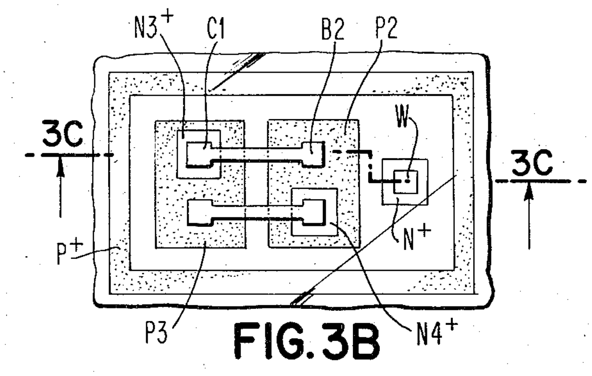
FIG. 3B is a plan view of a preferred integrated circuit layout for the structure of FIG. 3A.
Figure 3C:
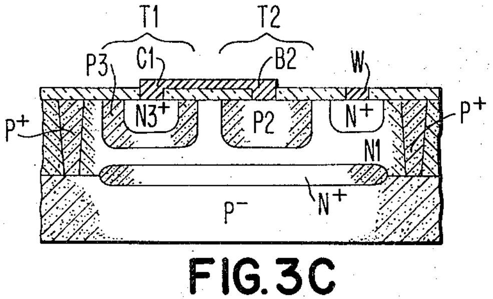
FIG. 3C is a cross-sectional view of the structure of FIG. 3B.

A second part of the circuit of FIG. 1, i.e., the circuit according to FIG. 3A, can be realized in a space-saving layout. As the two flipflop transistors T1 and T2 have different collector potentials it is generally possible to design them only as vertical transistors in two isolation pits. However, the two transistors can advantageously be arranged in one isolation pit, as shown in FIGS. 3B and 3C, by operating them inversely. Thus, the common emitter zones N1 are formed by the epitaxial layer serving simultaneously as word line W which is connected to the storage cell. The bulk resistance of epitaxial layer N1 can be reduced there by a highly doped sub-collector zone N+. Inserted into the two base zones P2 and P3 are collector zones N4 and N3 as highly doped zones which in normally operated vertical transistors can be used for making the emitter zones. The cross-coupling is realized by metallizations, e.g., between C1 and B2. The inverse current amplification is not as high as standard amplification but in the present case it is sufficient for operating the storage cell above the stability limit, and it offers the advantage of housing both flipflop transistors T1 and T2 very space-savingly within one isolation pit.

The stability limit, i.e., the lowest current possible for the storage cell to keep the information is substantially ensured by the emitter current of the cross-coupled transistors, where current amplification goes down to one. The fact that the differential load resistance of load transistors 10, 20 is practically infinite is an important factor in this connection.

Figure 4:
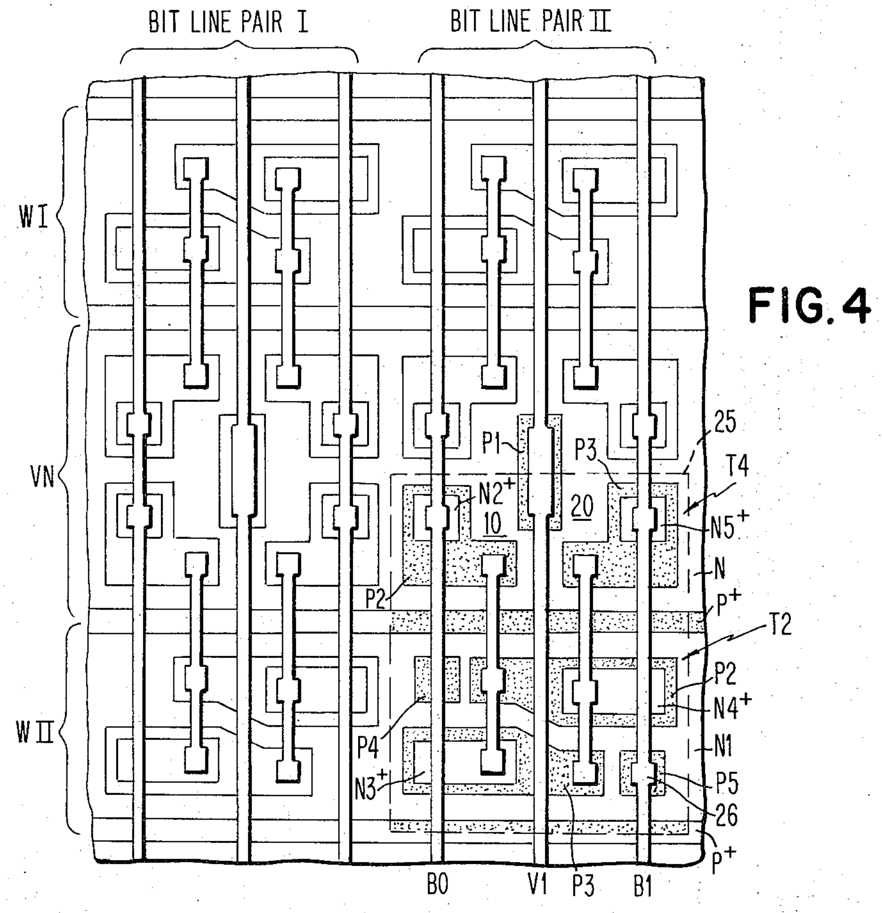
FIG. 4 is a plan view of a section of a storage matrix structured with storage cells according to FIG. 1 and utilizing design considerations developed in connection with FIGS. 2B and 3B.

In FIG. 4, the considerations developed in connection with FIGS. 2 and 3 are systematically continued for designing an extremely space-saving storage matrix utilizing the memory cell of FIG. 1. At the intersections of work and bit lines the storage cells of FIG. 1 are provided, one of which is designated more closely within the dashed-line part 25.

A pair of bit lines B0, B1, together with connection line V1, is applied vertically via metallizations. Word lines WI, WII extend horizontally in a sub-collector zone N+ or in epitaxial layer N1, respectively, of the isolation pit housing the cross-coupled flipflop transistors. Potential VN is applied in the epitaxial layer of the second isolation pit to the other transistors, i.e., the vertical read-write transistors T3, T4 and to the lateral load transistors 10, 20. As indicated by the layout, all storage cells common to one word are arranged in one and a half isolation zones. Therefore the second zone contains parts of the storage cells according to FIG. 2 in duplicate for cells of two adjacent words. Cross-coupling and connection of the circuit parts according to FIGS. 2 and 3 are realized in the matrix layout by means of metallization. Basically, connection line V1 can be arranged in a layout for storage cells according to FIG. 1 either in parallel to word line W or to bit lines B0, B1. In the present embodiment, the metallization for the connection line V1 extends in parallel to the bit lines, which has the advantage that the series bulk resistances of the work lines formed by the epitaxial layer do not represent a disturbance. Other line intersections are avoided.

The structural features discussed in the foregoing specification are disclosed in U.S. Pat. No. 3,643,235, entitled "Monolithic Semiconductor Memory," issued to Horst W. Berger et al. on Feb. 15, 1972 and assigned to the present assignee. The following specification deals with the additional transistors S and S' of FIG. 1 and FIG. 4 which are required for operating the above-described storage cell for write-read purposes as well as a read-only storage.

In the wiring diagram of the storage cell as shown in FIG. 1, each flipflop half is provided with an additional transistor S or S', respectively serving as a switching element and being complementary to flipflop transistors T1 and T2. The collectors of these switching transistors S' and S are connected to bases P2 and P3, respectively, and their bases N1 are connected to the emitters N1 of the flipflop transistors. According to the desired information to be stored in latent manner, the emitter of either transistor S or S' is connected, via a line 26, to the associated bit line B0 or B1. In the storage cell considered, the emitter of for instance transistor S is connected to bit line B1 whereas the connection between the emitter of the transistor S' to bit line B0 is missing. The information to be stored in a latent manner for read-only storage operation is introduced into the memory cell by load carrier injection which, depending on whether the connection 26 is made to transistor S or S', is directed into the base of the respective flip-flop transistor T1 or T2.

It is assumed that the storage cell has stored a 1 when the right-hand flipflop transistor T2 is switched on. If a 1 is to be stored as a latent information bit in the storage cell, the emitter P5 of transistor S is connected to bit line B1 via a line section 26. The connection is made conveniently by contact metal personalization during fabrication of the integrated circuit of FIG. 4. Both transistor S (generating the switchable assymmetry) and the corresponding transistor S' (re-generating the symmetry upon normal write-read operation) are always provided and latent information bit personalization of the plurality of storage cells is achieved by means of a special contact hole mask. The contact hole mask permits the respective emitter of transistor S or S' to be connected to the associated bit line via a line section 26 to establish the wanted latent bit pattern.

In normal write-read operation of the storage cell, the potentials on the work and bit lines are always selected in such a manner that the base-emitter diode of transistor S or S' does not carry a high current. Thus, the storage arrangement can be operated independently of the latent bit pattern. If, however, the latent bit pattern is to be written into the storage arrangement positive pulses are applied to bit lines B0 and B1 so that in each storage cell the respective transistor S connected to the associated bit line injects a corresponding current into the base of the associated flipflop transistor T1 or T2 and switches on this transistor. The reading-out of this latent bit pattern is performed as in normal write-read operation. Upon the reading-out of the information of a selected cell, however, the inverse current of transistors S serving as switching elements and belonging to the unselected storage cells at the same pair of bit lines could have a negative effect, for this current influences the read current in the bit line whereby the reading speed could be decreased. However, this effect could be eliminated if the emitters of the transistors S serving as switching elements are connected not to the bit lines of the same storage cell but to the bit lines of an adjacent storage cell of the same word. The parasitic current in the selected bit line can then be made negligible by operating during addressing, the storage cells at the adjacent bit lines with very low currents. These cells, however, can be switched off altogether for a short time during the read operation as owing to load carrier storage the information is maintained for a short period.

One advantage of the storage arrangement of the present invention is that the latent bit pattern can be very quickly introduced for read-only storage operation by selecting an injection current of suitable height. Furthermore, it is ensured that the symmetry of the storage cells is maintained almost completely during normal write-read operation.

The symmetry of the storage cells may be noted particularly in the layout, represented in FIG. 4. The storage cell within zone 25 has already been described in connection with the standard write-read operation. In order to achieve within the same structure the latent bit pattern of the present invention, a transistor S (generating the asymmetry with read-only storage operation) and a transistor S' (re-generating the symmetry for write-read operation) is merely added to each flipflop transistor T1, and T2. These additional transistors are formed by merely providing emitter zones P4 and P5 adjacent the base zones P2 and P3, respectively, of flipflop transistors T2 and T1 within the common epitaxial zone N1 representing the emitter zones of the flipflop transistors and at the same time the base zones of the additional transistors. The collector zones of the additional transistors coincide with the base zones of the respective flipflop transistors. Emitter zones P5 and P4 to be inserted additionally are arranged directly beneath the associated bit lines B1 and B0. This shows that the personalization of the storage cells within a matrix can be performed for instance by using a contact hole mask by means of which the required one-sided connection of the emitters of the additional transistors to the associated bit line can be carried out. The only asymmetry encountered in the write-read operation is resulting from the short contact 26 between the respective bit line and the emitter zone directly of transistor S generating the asymmetry. Another essential advantage consists in that the additional transistors can be implemented without additional space requirements or additional procedural steps.

Efforts are made to execute metallization for the purpose of personalization, i.e., the establishing of the connection 26 between the bit lines and the emitter zones of the additional switching transistors, as late as possible during the process. For that reason it is advantageous to employ the below-described metallization technique which is not executed before the end of the entire manufacturing process and which furthermore does not involve much effort.

The emitters P4 and P5 of all switching transistors S and S' are provided with contacts when the lines connecting the switching elements of the storage cells are established in a first metallization plane. It is only after the final passivation of the semiconductor chips that the personalization is executed. By means of a suitable contact hole mask adapted to the respective bit pattern, the necessary connections 26 between control lines applied on the passivation layer and forming a second metallization plane, and the above-mentioned contacts in the first metallization plane are established in the passivation layer. Subsequently, the latent bit pattern is made by group-wise or simultaneous addressing of the control lines of the second metallization plane. In this manner, the semiconductor chips can be pre-fabricated, with the inclusion of the passivation step, and subsequently personalized. The period of delivery for semiconductor chips of defined personalization can thus be considerably reduced.

While this invention has been particularly described with reference to the preferred embodiments thereof, it will be understood by those skilled in the art that the foregoing and other changes in form and details may be made therein without departing from the spirit and scope of the invention.

What is claimed is:

1. A monolithic storage arrangement operable both as a read-write storage and as a read-only storage, said storage arrangement comprising a plurality of bistable storage cells, a first switching element representing a controllable asymmetry connected to one side of said cell, a corresponding but non-controllable second switching element which maintains the symmetry of the storage cell during read-write operation connected to the other side of said cell, each said storage cell comprising a cross-coupled, bipolar transistor flipflop and each said switching element comprising a switching transistor which is complementary with respect to said flipflop transistors, the collector-base section of each said switching transistor being connected in parallel with the base-emitter section of the respective associated flipflop transistor, and a control line, the emitter of said first switching transistor being connected to said control line, said first switching transistor, when controlled via said control line, injecting a current pulse into the base of the associated flipflop transistor connected thereto.

2. A monolithic storage arrangement as claimed in claim 1, characterized in that a bit line of the storage arrangement is used as said control line.

3. A monolithic storage arrangement as claimed in claim 1, characterized in that said flipflop transistors are vertical transistors and that each said switching transistor is a lateral transistor comprising an additional emitter zone adjacent the base zone of a respective flipflop transistor, the base zone of said switching transistor coinciding with the emitter zone of said respective flipflop transistor, and the collector zone of said switching transistor coinciding with the base zone of said respective flipflop transistor.

4. A monolithic storage arrangement as claimed in claim 2, characterized in that said bit line is arranged over the respective associated emitter zone of said first switching transistor and is connected thereto via a conductive contact.

5. A monolithic storage arrangement comprising a plurality of cross-coupled bipolar transistor bitable flipflops, a plurality of switching bipolar transistors which are complementary with resepct to said cross-coupled transistors, the collector-base section of each said switching transistor being connected in parallel with the base-emitter section of a respective cross-coupled transistor, and a pair of control lines the emitter of one of said switching transistors per flipflop being connected to a respective one of said control lines and the emitter of the other one of said switching transistors per flipflop being unconnected to the other of said control lines in accordance with predetermined fabrication personalization, each said connected switching transistor injecting current into the base of the respective cross-coupled transistor under the control of said respective one of said control lines.

6. A monolithic storage arrangement as claimed in claim 5 and further including a pair of bit lines for each flipflop, said bit lines constituting said control lines.

7. A monolithic storage arrangement as claimed in claim 5 wherein said flipflop transistors are vertical transistors and each said switching transistor is a lateral transistor comprising an additional emitter zone adjacent the base zone of a respective flipflop transistor, the base zone of said switching transistor coinciding with the emitter zone of said respective flipflop transistor, and the collector zone of said switching transistor coinciding with the base zone of said respective flipflop transistor.

8. A monolithic storage arrangement as claimed in claim 6 wherein said bit lines are arranged over respective emitter zones of said first switching transistors and are selectively connected thereto in accordance with said predetermined fabrication personalization.

* * * * *

150
3)

UNITED STATES PATENT OFFICE
CERTIFICATE OF CORRECTION

Patent No. 3,801,967 Dated April 2, 1974

Inventor(s) Horst Heinz Berger, Knut Najmann, Hansgeorg Pietrass and Siegfried Wiedmann.

It is certified that error appears in the above-identified patent and that said Letters Patent are hereby corrected as shown below:

Column 6, Line 63 "work" should be --word--

Column 7, Line 19 "work" should be --word--

Column 8, Line 2 "work" should be --word--

Signed and sealed this 29th day of October 1974.

(SEAL)
Attest:

McCOY M. GIBSON JR.
Attesting Officer

C. MARSHALL DANN
Commissioner of Patents